United States Patent
Oyama

(10) Patent No.: US 10,230,301 B2
(45) Date of Patent: Mar. 12, 2019

(54) NON-ISOLATED DC/DC CONVERTER

(71) Applicant: ROHM CO., LTD., Ukyo-Ku, Kyoto (JP)

(72) Inventor: Manabu Oyama, Kyoto (JP)

(73) Assignee: ROHM CO. LTD., Kyoto (JP)

( * ) Notice: Subject to any disclaimer, the term of this patent is extended or adjusted under 35 U.S.C. 154(b) by 0 days.

(21) Appl. No.: 15/840,707

(22) Filed: Dec. 13, 2017

(65) Prior Publication Data
US 2018/0166989 A1   Jun. 14, 2018

(30) Foreign Application Priority Data

| Dec. 13, 2016 | (JP) | 2016-241435 |
| Dec. 13, 2016 | (JP) | 2016-241436 |
| Nov. 9, 2017 | (JP) | 2017-216049 |

(51) Int. Cl.
| *G05F 1/40* | (2006.01) |
| *H02M 3/156* | (2006.01) |
| *H02M 1/08* | (2006.01) |
| *H02M 7/06* | (2006.01) |
| *H02M 1/36* | (2007.01) |
| *H02M 1/00* | (2006.01) |

(52) U.S. Cl.
CPC ............. *H02M 3/156* (2013.01); *H02M 1/08* (2013.01); *H02M 1/36* (2013.01); *H02M 7/06* (2013.01); *H02M 2001/0093* (2013.01)

(58) Field of Classification Search
CPC ........... H02M 3/156; H02M 3/158; H02M 2001/0009; H02M 7/06; H02M 2001/009

USPC .............. 323/222, 262, 266, 267, 271–273, 323/282–288
See application file for complete search history.

(56) References Cited

U.S. PATENT DOCUMENTS

| 4,242,286 A * | 12/1980 | Ohsaka ............... C07C 17/206 558/411 |
| 4,922,906 A * | 5/1990 | Takeuchi ........... A61N 1/36014 607/152 |
| 5,528,132 A * | 6/1996 | Doluca ..................... G05F 1/46 323/284 |
| 7,230,408 B1* | 6/2007 | Vinn ..................... H02M 3/156 323/273 |
| 7,688,045 B2* | 3/2010 | Wang ................... H02M 3/156 323/265 |
| 8,797,006 B2* | 8/2014 | Kuo ..................... H02M 7/066 323/222 |
| 9,570,985 B2* | 2/2017 | Sato .................... H02M 3/1588 |

FOREIGN PATENT DOCUMENTS

JP   2001136735 A   5/2001

* cited by examiner

*Primary Examiner* — Rajnikant Patel
(74) *Attorney, Agent, or Firm* — Cantor Colburn LLP

(57) ABSTRACT

A buck converter includes a switching transistor. A switching line connected to a source of the switching transistor is connected to a ground of a controller. The controller drives the switching transistor and generates a step-up pulse. The step-up circuit receives an output voltage $V_{OUT}$ of a DC/DC converter and generates a power supply voltage $V_{BOOST}$ of the controller using the step-up pulse.

13 Claims, 13 Drawing Sheets

NON-ISOLATED DC/DC CONVERTER

CROSS-REFERENCE TO RELATED APPLICATION(S)

The present invention claims priority under 35 U.S.C. § 119 to Japanese Patent Application No. 2016-241436, filed on Dec. 13, 2016, Japanese Patent Application No. 2016-241435, filed on Dec. 13, 2016 and Japanese Patent Application No. 2017-216049, filed on Nov. 9, 2017, the entire contents of which are incorporated herein by reference.

BACKGROUND OF THE INVENTION

1. Field of the Invention

The present invention relates to a non-isolated DC/DC converter.

2. Description of the Related Art

Various home appliances such as refrigerators, washing machines, and rice cookers operate by receiving commercial alternating current (AC) power from the outside. A power supply apparatus (AC/DC converter) that converts a commercial AC voltage to AC or direct current (DC) is built in such home appliances and electronic devices (hereinafter collectively referred to as the electronic device).

FIG. 1 is a block diagram illustrating a basic configuration of an AC/DC converter 100R that has been studied by the inventor of the present application. The AC/DC converter 100R mainly includes a rectifier circuit 104, a smoothing capacitor 106, and a DC/DC converter 200R.

The rectifier circuit 104 is a diode bridge circuit that performs full-wave rectification of an AC voltage $V_{AC}$. An output voltage of the rectifier circuit 104 is smoothed by the smoothing capacitor 106 and converted into a DC voltage $V_{DC}$.

The home appliances such as washing machines and refrigerators have electrical terminals which are not exposed to the outside, and have an insulating structure as a whole product. In such home appliances, a non-isolated DC/DC converter is used in place of an isolated flyback converter. The non-isolated DC/DC converter 200R receives the DC voltage $V_{DC}$ at an input terminal $P_1$, steps down the DC voltage $V_{DC}$, and supplies an output voltage $V_{OUT}$ stabilized at a target value to a load (not illustrated) connected to an output terminal $P_2$. The DC/DC converter 200R includes a non-isolated buck converter 202, a controller 300, and other peripheral components. The buck converter 202 includes a switching transistor $M_1$, an inductor $L_1$, a rectifier diode $D_1$, and an output capacitor $C_1$.

The controller 300R drives the switching transistor $M_1$ to generate the stabilized output voltage $V_{OUT}$ at the output terminal $P_2$. The switching transistor $M_1$ is an N-channel metal oxide semiconductor field effect transistor (MOSFET). A ground (GND) pin of the controller 300R is connected to a source of the switching transistor $M_1$, so that a ground of the controller 300R is a source voltage $V_S$ of the switching transistor $M_1$ and fluctuates in synchronization with switching of the switching transistor $M_1$.

A diode $D_2$ and a capacitor $C_2$ are provided between the output terminal (output line) $P_2$ of the DC/DC converter 200R and the GND pin. A power supply ($V_{IN}$) pin of the controller 300R is connected to a connection node between the diode $D_2$ and the capacitor $C_2$. A power supply voltage $V_{DD}$ of the controller 300R is a potential difference between the $V_{IN}$ pin and the GND pin, and thus, is equal to a voltage $V_{C2}$ across the capacitor $C_2$.

The source voltage $V_S$ of the switching transistor $M_1$ is $-V_F$ while the switching transistor $M_1$ is turned off. That is, $V_{OUT}-V_F$ is applied to one end of the capacitor $C_2$ and $-V_F$ is applied to the other end thereof. $V_F$ is a forward voltage of the diode. At this time, the voltage $V_{C2}$ across the capacitor $C_2$ is charged to $V_{OUT}$, so that the power supply voltage $V_{DD}$ of the controller 300R is equal to the output voltage $V_{OUT}$.

The source voltage $V_S$ of the GND pin jumps to the vicinity of the DC voltage $V_{DC}$ during the OFF period of the switching transistor $M_1$. At this time, an input voltage $V_1$ at the other end of the capacitor $C_2$ becomes $V_{DC}+V_{OUT}$. Because of $V_1>V_{OUT}$, the capacitor $C_2$ and the output terminal $P_2$ are disconnected by the rectifier diode $D_2$, and the voltage across the capacitor $C_2$ is maintained. The power supply voltage $V_{DD}$ of the controller 300R is equal to the output voltage $V_{OUT}$ even during the OFF period of the switching transistor $M_1$.

The DC voltage $V_{DC}$ is input to a high voltage (VH) pin of the controller 300R. A starter circuit inside the controller 300R charges the capacitor $C_2$ using the DC voltage $V_{DC}$ and generates its own power supply voltage $V_1$ when the DC/DC converter 200R is activated.

A voltage $V_{FB}$ obtained by dividing the voltage $V_{C2}$ generated by the capacitor $C_2$ by resistors $R_{11}$ and $R_{12}$ is fed back to a feedback (FB) pin of the controller 300R. The controller 300R performs feedback control of a duty ratio (or a frequency) of a gate drive pulse $V_G$ of the switching transistor $M_1$ such that a feedback voltage $V_{FB}$ coincides with an internal reference voltage $V_{REF}$. As a result, the output voltage $V_{OUT}$ is stabilized to a target voltage $V_{OUT(REF)}$.

$$V_{OUT(REF)}=V_{REF}\times(R_{11}+R_{12})/R_{12}$$

The inventor of the present application has conducted studies regarding the DC/DC converter 200R of FIG. 1, and as a result, has recognized the following problem.

As described above, the power supply voltage $V_{DD}$ of the DC/DC converter 200R depends on the output voltage $V_{OUT}$. In order to turn on the switching transistor $M_1$, $V_{DD}>V_{GS(th)}$ needs to be established, so that $V_{OUT}>V_{GS(th)}$ needs to be established. $V_{GS(th)}$ is a gate threshold voltage of the switching transistor $M_1$.

As described above, the DC/DC converter 200R has a problem that a setting range (lower limit) of the output voltage $V_{OUT}$ is restricted by a characteristic (gate threshold voltage $V_{GS(th)}$) of the switching transistor $M_1$.

SUMMARY OF THE INVENTION

The present invention has been made in view of the above problem, and one of exemplary general purposes of an embodiment is to provide a DC/DC converter capable of generating a low voltage.

One embodiment of the present invention relates to a non-isolated DC/DC converter. The DC/DC converter includes: a buck converter including a switching transistor; a controller whose ground is connected to a switching line connected to a source of the switching transistor, and which drives the switching transistor and generates a step-up pulse; and a step-up circuit which receives an output voltage of the DC/DC converter and generates a power supply voltage of the controller by using the step-up pulse.

According to this embodiment, it is possible to step up the output voltage by the step-up circuit and generate the power supply voltage higher than the output voltage. Therefore, it is possible to lower a set value of the output voltage of the DC/DC converter.

The switching transistor may be built in the same package as the controller.

The controller may include: an oscillator; a pulse width modulator which generates a pulse signal in synchronization with a signal generated by the oscillator; a driver which drives the switching transistor according to the pulse signal; and a step-up pulse generator which generates the step-up pulse based on a signal generated by the oscillator.

The step-up circuit may include: a first capacitor whose one end is connected to a switching line; a first diode which has an anode receiving the output voltage of the DC/DC converter and a cathode connected to the other end of the first capacitor; and a charge pump circuit which is configured with the switching line as a ground, receives a voltage across the first capacitor as an input voltage, and performs a step-up operation according to the step-up pulse.

The controller may receive a voltage of the other end of the first capacitor as a feedback voltage and drive the switching transistor such that the feedback voltage coincides with a reference voltage. As a result, it is possible to stabilize the output voltage of the DC/DC converter to a target voltage according to the reference voltage.

The charge pump circuit may generate a voltage obtained by adding the voltage across the first capacitor and an amplitude of the step-up pulse.

The charge pump circuit may include a plurality of diodes.

The charge pump circuit may include a plurality of switches. A drive circuit which drives the plurality of switches in synchronization with the step-up pulse may be further provided.

The plurality of switches and the drive circuit may be integrated on the same semiconductor substrate as the controller.

Another embodiment of the present invention relates to electronic equipment. An electronic device may include: a load; a diode rectifier circuit which performs full-wave rectification of an AC voltage; a smoothing capacitor which smooths an output voltage of the diode rectifier circuit to generate a DC input voltage; and a DC/DC converter which steps down the DC input voltage and supplies the stepped-down DC input voltage to the load.

Another embodiment of the present invention relates to a controller of a non-isolated DC/DC converter. The DC/DC converter includes not only the controller but also a buck converter and a step-up circuit which generates a power supply voltage of the controller according to an output voltage of the DC/DC converter and a step-up pulse. The controller includes: a switching transistor; a ground pin connected to a source of the switching transistor; a high-voltage pin connected to a drain of the switching transistor; a feedback pin which needs to receive a feedback voltage according to the output voltage of the DC/DC converter; an oscillator; a pulse modulator which generates a pulse signal whose duty ratio varies such that the feedback voltage and a reference voltage approximate to each other in synchronization with the oscillator; a driver which drives the switching transistor based on the pulse signal; and a step-up pulse generator which generates the step-up pulse in synchronization with the oscillator.

The controller may be integrally integrated on one semiconductor substrate.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Hereinafter, the present invention will be described with reference to the drawings based on preferred embodiments. The same or similar components, members, and processes illustrated in the respective drawings are denoted by the same reference signs, and redundant description thereof will be omitted as appropriate. In addition, the embodiments are described only for exemplary purposes without limiting the invention, and all features and combinations thereof described in the embodiments are not necessarily essential to the invention.

In the present specification, a "state where a member A is connected to a member B" includes not only a state where the member A is physically and directly connected to the member B but also a state where the member A is indirectly connected to the member B via another member that does not substantially affect such an electrical connection state therebetween or does not impair functions and effects exhibited by such a combination.

Similarly, a "state where a member C is provided between a member A and a member B" includes not only a state where the member A is directly connected to the member C, or the member B is directly connected to the member C but also a state where the member A is indirectly connected to the member C or the member B is indirectly connected to the member C via another member that does not substantially affect such an electrical connection state therebetween, or that does not impair functions and effects exhibited by such a combination.

First Embodiment

Figure 2:
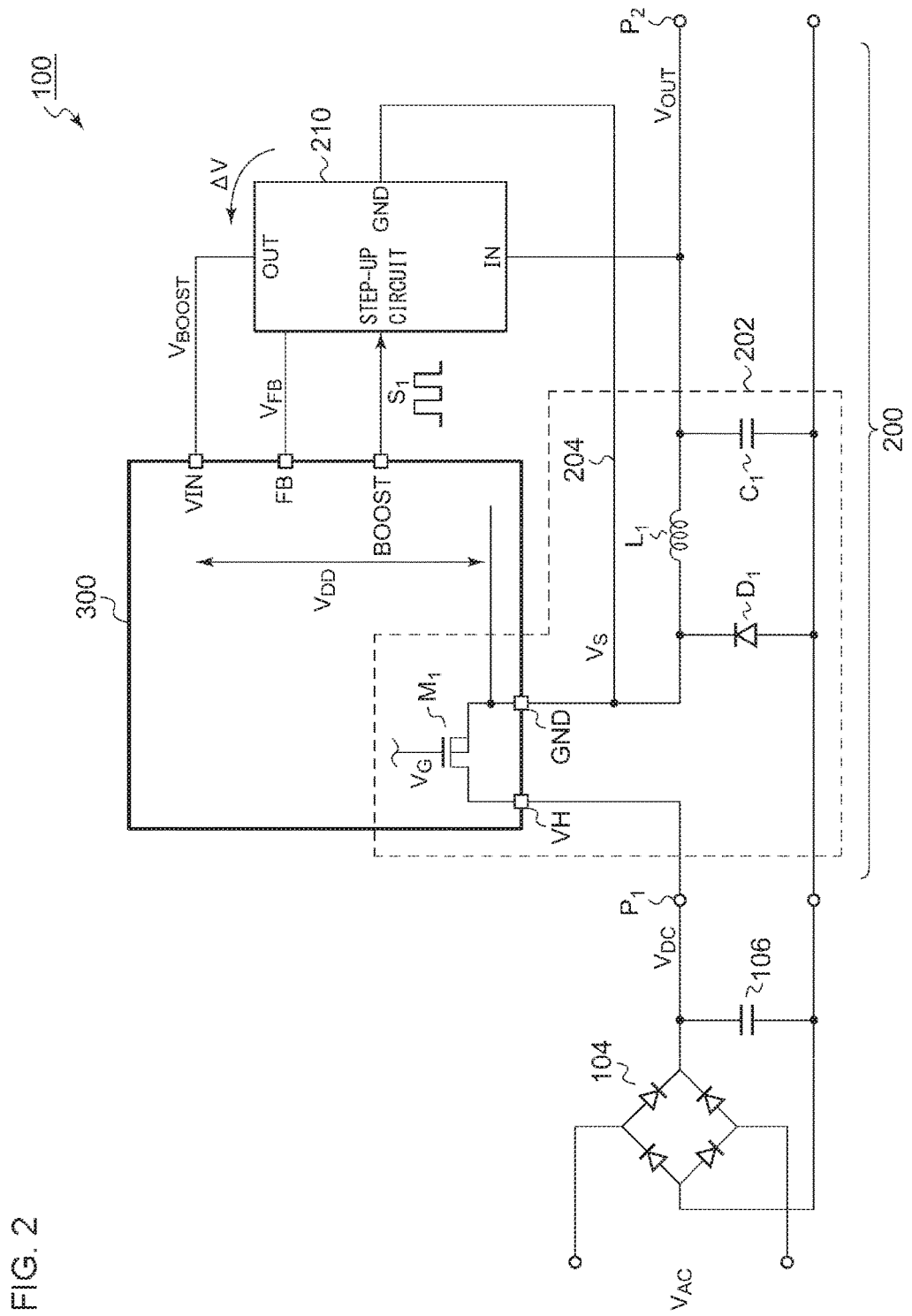
FIG. 2 is a circuit diagram of an AC/DC converter including a DC/DC converter according to a first embodiment.

FIG. 2 is a circuit diagram of an AC/DC converter 100 including a DC/DC converter 200 according to a first embodiment. The AC/DC converter 100 includes a rectifier circuit 104, a smoothing capacitor 106, and a DC/DC converter 200.

The DC/DC converter 200 includes a non-isolated buck converter (step-down converter) 202, a step-up circuit 210, a controller 300, and peripheral components. A configuration of the buck converter 202 is similar to that of FIG. 1, and includes a switching transistor $M_1$, a rectifier diode $D_1$, an inductor $L_1$, and an output capacitor $C_1$.

The controller 300 includes a VH pin, a GND pin, a VIN pin, an FB pin, a step-up (boost) pin. The switching transistor $M_1$ of the buck converter 202 is built in the same package as the controller 300.

The GND pin is connected to a source of the switching transistor $M_1$. A wiring connected to the GND pin is referred to as a switching line 204. The controller 300 operates with a potential of the GND pin (that is, a potential $V_S$ of the switching line 204) as a ground. The controller 300 generates a pulse signal whose duty ratio (or frequency) varies such that a voltage $V_{FB}$ fed back to the FB pin coincides with a predetermined target value, and supplies a gate drive pulse $V_G$ according to the pulse signal to the switching transistor $M_1$. A voltage having a correlation with an output voltage $V_{OUT}$ may be fed back to the FB pin, and this voltage is not particularly limited.

The controller 300 generates a step-up pulse $S_1$ and outputs the generated step-up pulse from the boost pin. The step-up pulse $S_1$ is input to the step-up circuit 210. For example, it is desirable that a duty ratio of the step-up pulse $S_1$ be not dependent on an operation state of the DC/DC converter 200, and is fixed at a predetermined value in the vicinity of 50% (40 to 60%).

The step-up circuit 210 receives the output voltage $V_{OUT}$ of the DC/DC converter 200 (buck converter 202), generates a power supply voltage $V_{BOOST}$ obtained by stepping up the output voltage $V_{OUT}$ at an output OUT thereof using the step-up pulse $S_1$, and supplies the generated voltage to the input pin ($V_{IN}$) of the controller 300. This power supply voltage $V_{BOOST}$ fluctuates while maintaining a higher state than a voltage $V_S$ of the switching line 204 by a constant potential difference $\Delta V$.

$$V_{BOOST} = V_S + \Delta V \quad (1)$$

The potential difference $\Delta V$ is given as $\Delta V = V_{OUT} + V_{ADD} \ldots$ (2A) when a step-up voltage width by the step-up circuit 210 is $V_{ADD}$. From another point of view, the potential difference $\Delta V$ generated by the step-up circuit 210 may be expressed as Formula (2B) assuming that a step-up rate by the step-up circuit 210 is $\alpha$ ($\alpha > 1$).

$$\Delta V = \alpha \times V_{OUT} \quad (2B)$$

The potential difference $\Delta V$ is determined so as to be larger than a gate threshold voltage $V_{GS(th)}$ of the switching transistor $M_1$.

$$\Delta V > V_{GS(th)} \quad (3)$$

Figure 3:
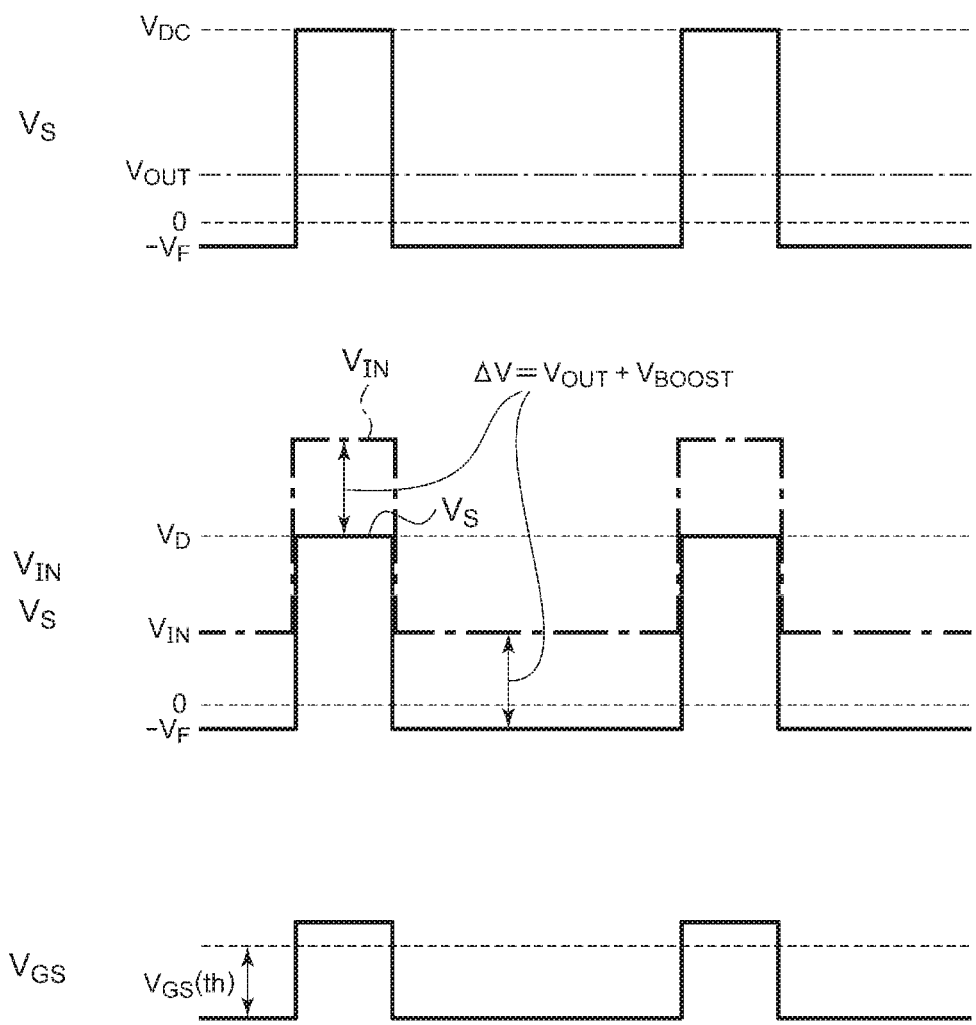
FIG. 3 is an operation waveform diagram of the DC/DC converter of FIG. 2.

The configuration of the DC/DC converter 200 has been described as above. Next, an operation thereof will be described. FIG. 3 is an operation waveform diagram of the DC/DC converter 200 in FIG. 2. When the switching transistor $M_1$ is switched at a duty ratio D in a steady state, the output voltage is stabilized such that $V_{OUT} \approx D \times V_{DC}$. At this time, the voltage $V_S$ of the switching line is switched between $V_{DC}$ and $-V_F$.

As described above, the power supply voltage $V_{BOOST}$ fluctuates while maintaining a state of being higher than the voltage $V_S$ of the switching line 204 by the potential difference $\Delta V$. This potential difference $\Delta V$ is larger than the gate threshold voltage $V_{GS(th)}$ of the switching transistor $M_1$.

$$V_{BOOST} = V_S + \Delta V \quad (4)$$

Here, $\Delta V = V_{OUT} + V_{ADD} > V_{GS(th)}$

A potential difference between the VIN pin and the GND pin of the controller 300, that is, a power supply voltage $V_{DD}$ of the controller 300 is $V_{DD} = V_{BOOST} - V_S = \Delta V$. Since $\Delta V > V_{GS(th)}$ is established although a maximum amplitude of a voltage (gate-source voltage) $V_{GS}$ that can be generated between a gate and the source of the switching transistor $M_1$ by the controller 300 is the power supply voltage $V_{DD} = \Delta V$, the controller 300 can reliably turn on the switching transistor $M_1$.

Figure 1:
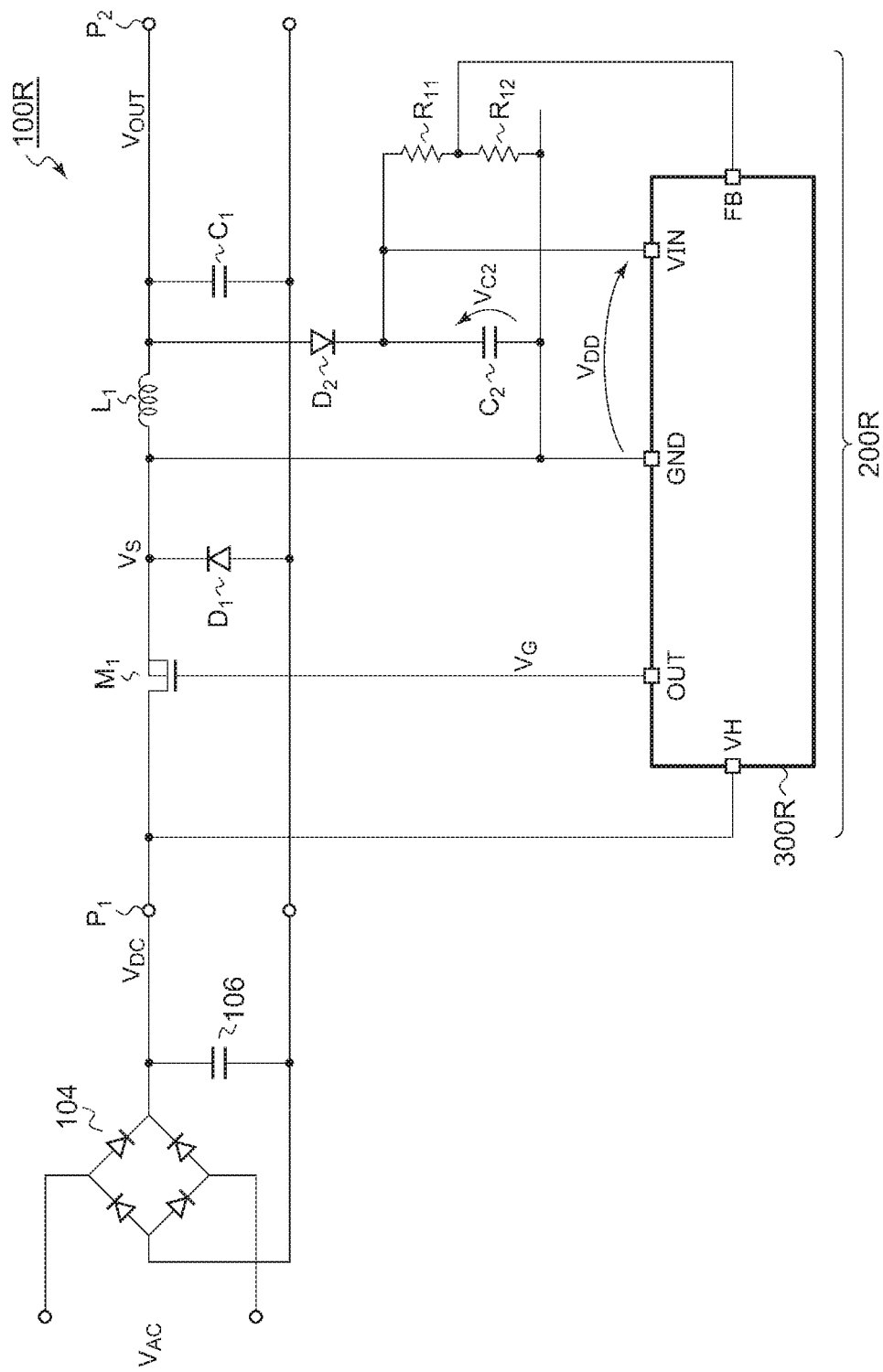
FIG. 1 is a block diagram illustrating a basic configuration of an AC/DC converter that has been studied by the inventor of the present application.

Since $\Delta V = V_{DD} \approx V_{OUT}$ in a DC/DC converter 200R of FIG. 1, it is necessary to satisfy that $V_{OUT} > V_{GS(th)}$. In contrast, $\Delta V = V_{OUT} + V_{ADD}$ is established according to the DC/DC converter 200 of FIG. 2, and thus, it is possible to satisfy that $V_{OUT} < V_{GS(th)}$. That is, a target voltage of the output voltage $V_{OUT}$ can be arbitrarily set without being restricted by the gate threshold voltage $V_{GS(th)}$, and can be set to be lower than that of the related art.

As a modification, it is also conceivable to use the gate drive pulse $V_G$ as the step-up pulse $S_1$. Then, a duty ratio of the step-up pulse $S_1$ varies when a duty ratio of the gate drive pulse $V_G$ varies, and thus, a situation that is not preferable for a step-up operation may occur. In this embodiment, it is possible to set the duty ratio of the step-up pulse $S_1$ to a value optimum for the step-up operation.

Hereinafter, specific configuration examples and examples relating to the first embodiment will be described in order not to narrow the scope of the present invention but to aid understanding of the essence of the invention and the circuit operation and for the sake of clarification thereof.

Figure 4:
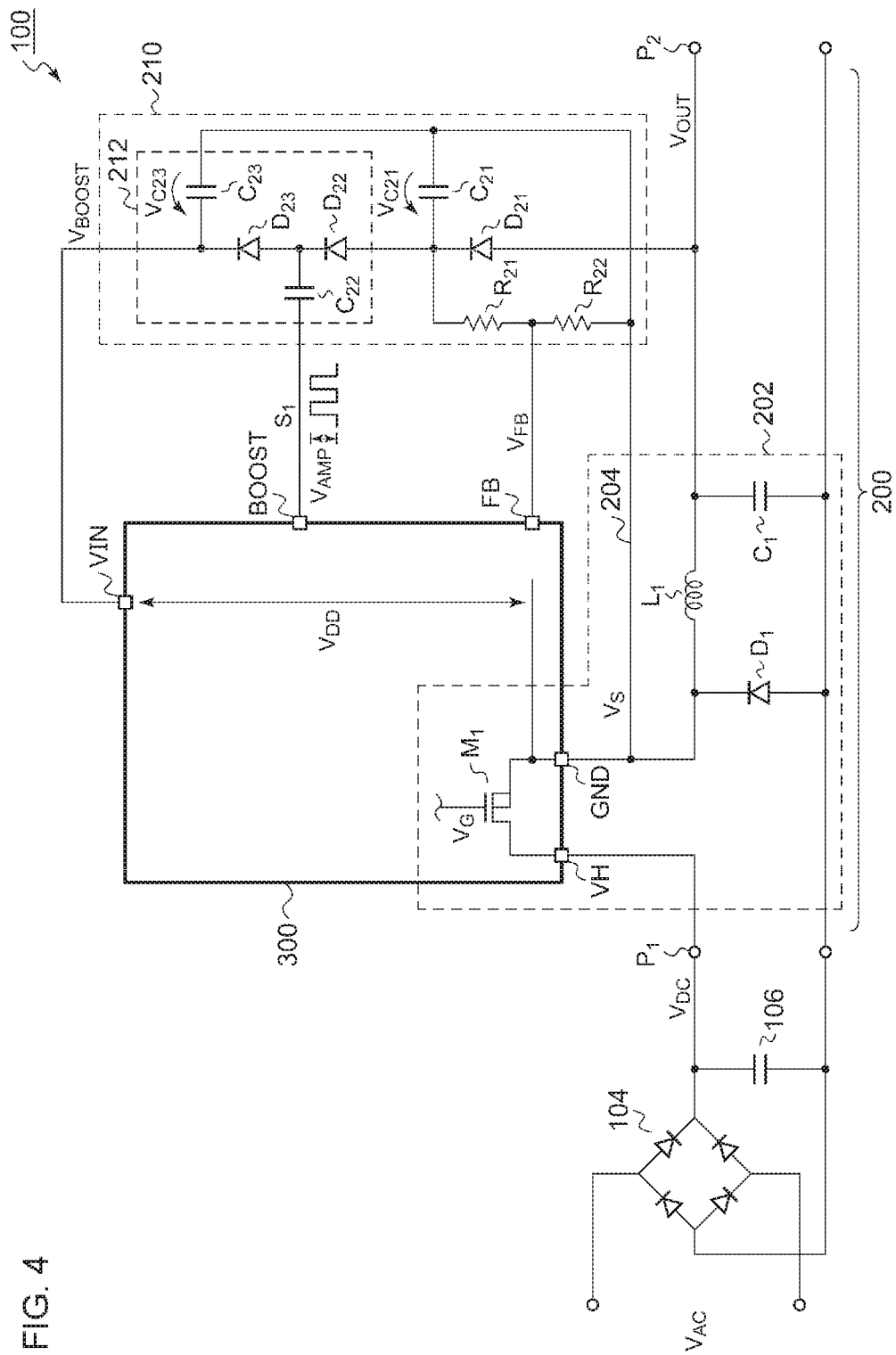
FIG. 4 is a circuit diagram illustrating a specific configuration example of the DC/DC converter of FIG. 2.

FIG. 4 is a circuit diagram illustrating a specific configuration example of the DC/DC converter 200 in FIG. 2. The step-up circuit 210 includes a first diode $D_{21}$, a first capacitor $C_{21}$, and a charge pump circuit 212.

One end of the first capacitor $C_{21}$ is connected to the switching line 204. The first diode $D_{21}$ has an anode that receives the output voltage $V_{OUT}$ of the DC/DC converter 200 (buck converter 202) and a cathode that is connected to the other end of the first capacitor $C_{21}$.

The charge pump circuit 212 is configured with the switching line 204 as a ground. The charge pump circuit 212 receives a voltage $V_{C21}$ across the first capacitor $C_{21}$ as an input voltage and performs a step-up operation according to the step-up pulse $S_1$.

The charge pump circuit 212 is a voltage addition-type charge pump and includes a second diode $D_{22}$, a third diode $D_{23}$, a flying capacitor $C_{22}$, and an output capacitor $C_{23}$. A voltage $V_{C23}$ is generated across the output capacitor $C_{23}$ by a step-up operation of the charge pump circuit 212. Here, a forward voltage of the diode is not considered.

$$V_{C23} \approx V_{C21} + V_{AMP} \quad (5)$$

$V_{AMP}$ is an amplitude of the step-up pulse $S_1$ when the potential $V_S$ of the switching line 204 is set as a reference. Considering the forward voltage, $$V_{C23} = V_{C21} + V_{AMP} - 2V_F \quad (6).$$

Voltage $V_{C21}$ of FIG. 4 is a voltage corresponding to a voltage $V_{IN}$ of FIG. 1, and thus, is equal to $V_{OUT}$. In addition, the voltage $V_{C23}$ of the output capacitor $C_{23}$ is $\Delta V$ in FIG. 3. Therefore, Formula (5) can be rewritten to Formula (7).

$$\Delta V = V_{OUT} + V_{AMP} \quad (7)$$

In this manner, the appropriate power supply voltage $V_{BOOST}$ can be supplied to the VIN pin of the DC/DC converter 200 according to the step-up circuit 210 of FIG. 4.

For example, the voltage $V_{FB}$ obtained by dividing the voltage $V_{C21}$ across the first capacitor $C_{21}$ by resistors $R_{21}$ and $R_{22}$ is fed back to the FB pin of the controller 300. In this case, the gate drive pulse $V_G$ is generated such that $V_{FB}=V_{C21} \times R_{22}/(R_{21}+R_{22})$ coincides with an internal reference voltage $V_{REF}$. Therefore, feedback is applied such that $V_{C21}=(R_{21}+R_{22})/R_{22} \times V_{REF}$. As described above, since $V_{C21}=V_{OUT}$, a target voltage $V_{OUT(REF)}$ of the output voltage $V_{OUT}$ becomes $V_{OUT(REF)}=(R_{21}+R_{22})/R_{22} \times V_{REF}$.

Figure 5:
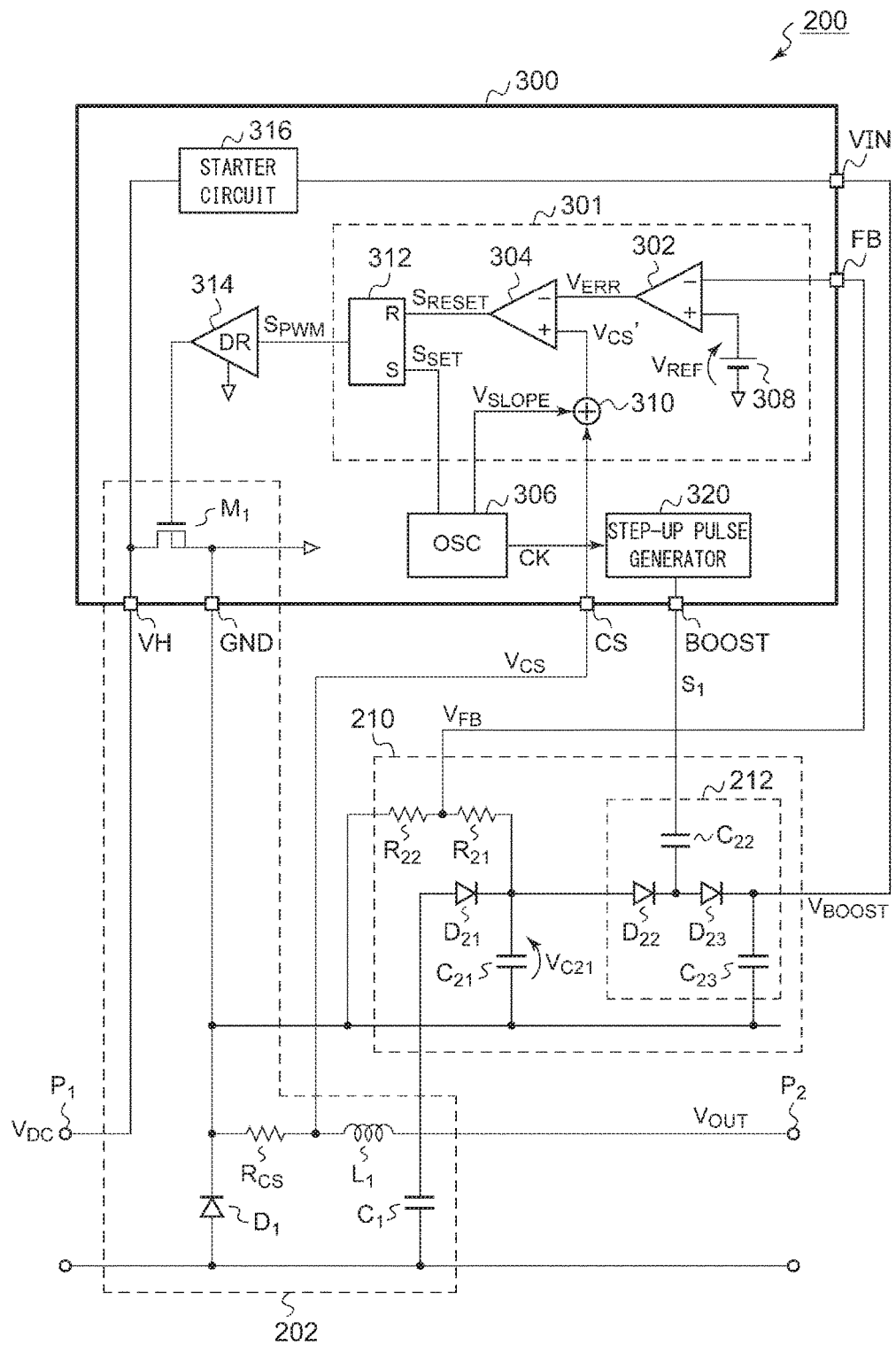
FIG. 5 is a circuit diagram illustrating a configuration example of a controller.

FIG. 5 is a circuit diagram illustrating a configuration example of the controller 300. The controller 300 is a controller of a peak current mode. The buck converter 202 includes a current sense resistor $R_{CS}$ provided between the switching transistor $M_1$ and the inductor $L_1$. A current detection signal $V_{CS}$ corresponding to a voltage drop across the current sense resistor $R_{CS}$ is input to a current sense (CS) pin of the controller 300.

An internal circuit of the controller 300 operates with the voltage $V_S$ of the switching line 204 supplied to the GND pin as a ground. The controller 300 includes a pulse modulator 301, an oscillator 306, a driver 314, and a step-up pulse generator 320.

The oscillator 306 oscillates at a predetermined frequency to generate a set pulse $S_{SET}$ and a slope signal $V_{SLOPE}$. The pulse modulator 301 generates a pulse signal $S_{PWM}$ in synchronization with the signals $S_{SET}$ and $V_{SLOPE}$ generated by the oscillator 306.

A reference voltage source 308 generates the reference voltage $V_{REF}$. An error amplifier 302 amplifies an error between the voltage $V_{FB}$ fed back to the FB pin and the reference voltage $V_{REF}$ to generate an error signal $V_{ERR}$. A slope compensator 310 superimposes the slope signal $V_{SLOPE}$ on the current detection signal $V_{CS}$ input to the CS pin. A comparator 304 compares the error signal $V_{ERR}$ with a current detection signal $V_{CS}'$ on which the slope signal $V_{SLOPE}$ is superimposed, and asserts a reset pulse $S_{RESET}$ (for example, sets the reset pulse to a high level) when $V_{CS}' > V_{ERR}$. A flip-flop 312 transitions to an off-level (for example, a low level) in response to the assertion of the reset pulse $S_{RESET}$, and generates a pulse signal $S_{PWM}$ to transition to an on-level (for example, a high level) in response to the set pulse $S_{SET}$. A driver 314 generates the gate drive pulse $V_G$ of the switching transistor $M_1$ based on the pulse signal $S_{PWM}$. A starter circuit 316 receives a DC voltage $V_{DC}$ input to the VH pin and charges the capacitor $C_{23}$ via the VIN pin at the time of activating the controller 300.

The step-up pulse generator 320 generates the step-up pulse $S_1$ based on a clock signal CK generated by the oscillator 306. The step-up pulse generator 320 may be a buffer or an inverter that receives the clock signal CK and applies the clock signal to the flying capacitor $C_{22}$.

Incidentally, a frequency of the clock signal CK (that is, a switching frequency of the switching transistor $M_1$) is not always suitable as an operation frequency of the charge pump circuit 212. Thus, the step-up pulse generator 320 may include a frequency divider that multiplies or divides the clock signal CK and generate the step-up pulse $S_1$ having a frequency optimum for the operation of the charge pump circuit 212.

First Modification

Figure 6A:
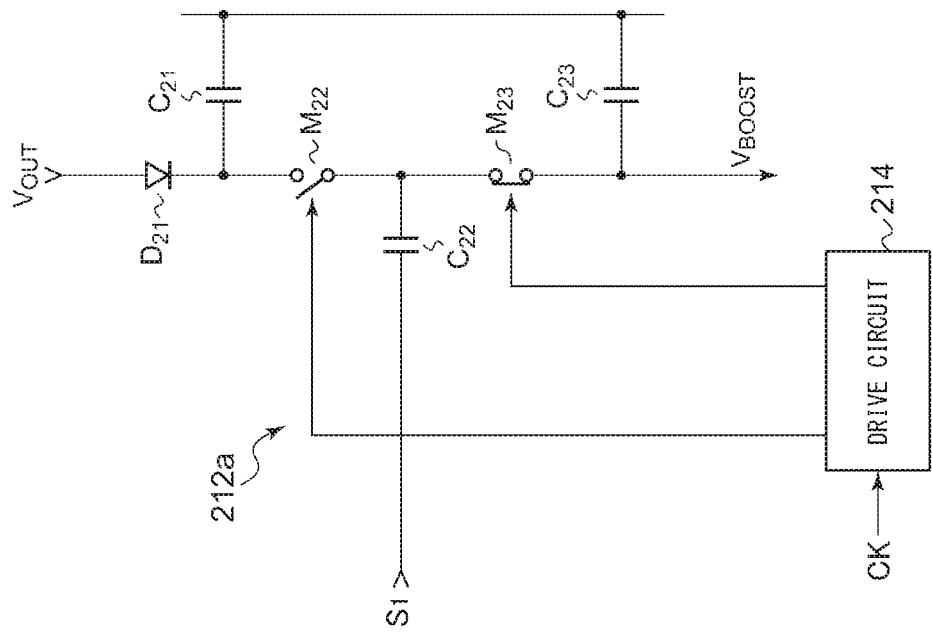
FIGS. 6A and 6B are circuit diagrams illustrating modifications of a step-up circuit.
Figure 6B:
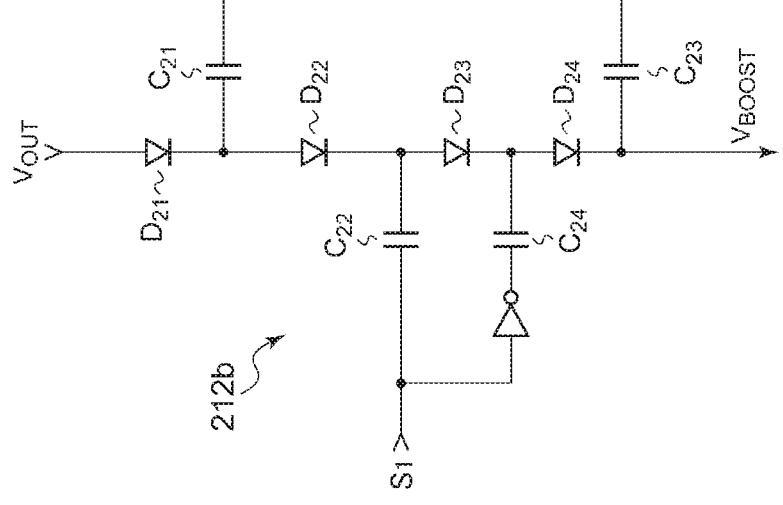

Next, modifications relating to the first embodiment will be described. The configuration of the step-up circuit 210 is not limited to FIG. 4. FIGS. 6A and 6B are circuit diagrams illustrating modifications of the step-up circuit 210. A charge pump circuit 212a in FIG. 6A includes switches $M_{22}$ and $M_{23}$ in place of the diodes $D_{22}$ and $D_{23}$, and a drive circuit 214 of the switches $M_{22}$ and $M_{23}$. The drive circuit 214 drives the switches $M_{22}$ and $M_{23}$ in synchronization with the clock signal CK generated by the oscillator 306. The drive circuit 214 may be built in the controller 300. In addition, the switches $M_{22}$ and $M_{23}$ configured using MOSFETs may be built in the controller 300.

FIG. 6B illustrates a two-stage charge pump circuit 212b which includes two flying capacitors $C_{22}$ and $C_{24}$. A step-up voltage may be expressed by the following formula when a forward voltage of a rectifier element is not considered.

$$V_{BOOST} = V_{OUT} + V_{AMP} \times 2$$

The number of stages of the charge pump circuit is not particularly limited and may be three or more.

Second Modification

Figure 7:
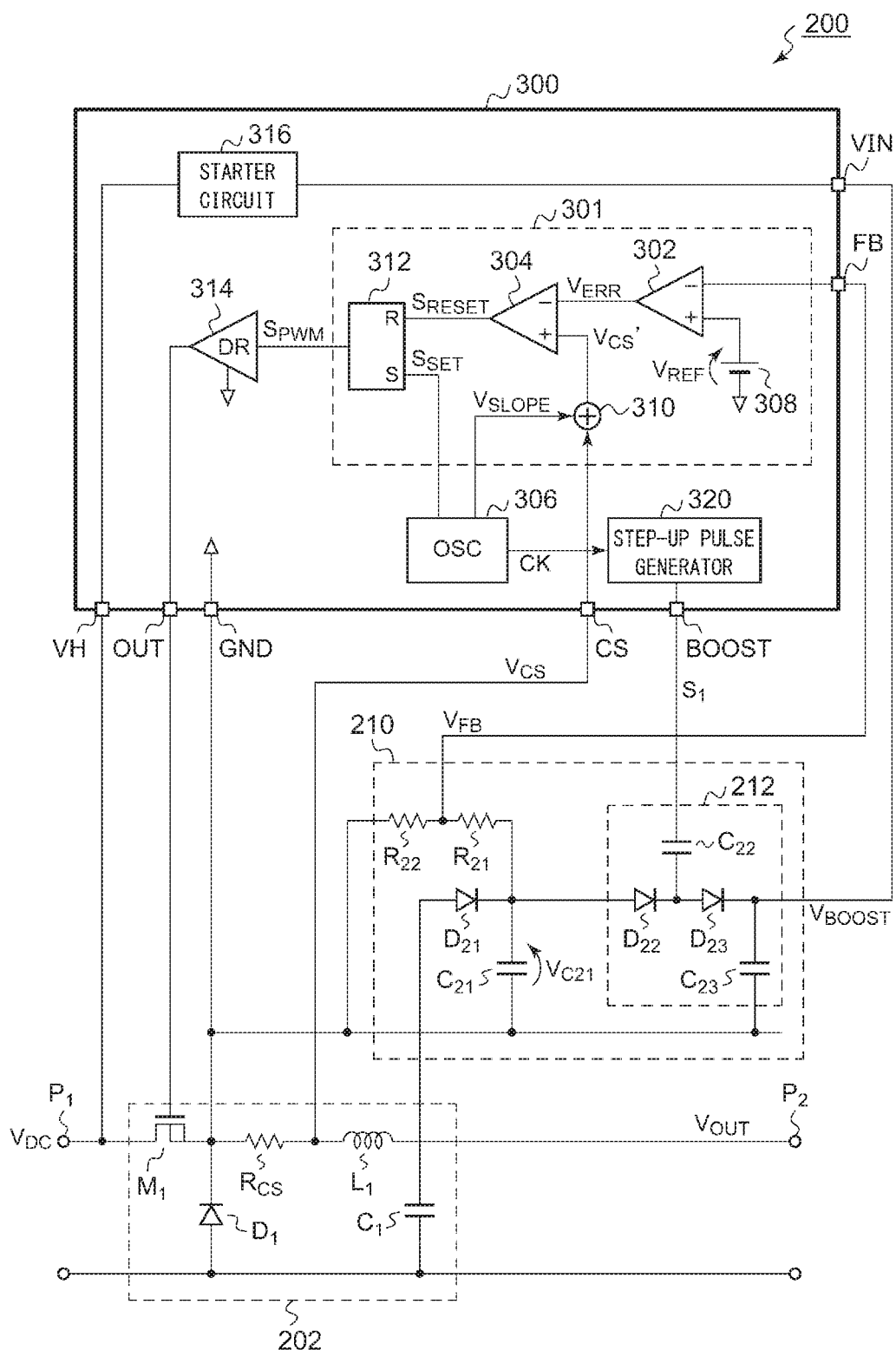
FIG. 7 is a circuit diagram of a DC/DC converter according to a second modification.

The switching transistor $M_1$ may be externally attached to the controller 300. FIG. 7 is a circuit diagram of the DC/DC converter 200 according to a second modification. The controller 300 includes an OUT pin connected to the gate of the switching transistor $M_1$.

The driver 314 outputs the gate drive pulse $V_G$ from the OUT pin. Other configurations are the same as those in FIG. 5.

Third Modification

The configuration of the controller 300 is not limited to those in FIGS. 5 and 7, and a controller of an average current mode or a controller of a voltage mode may be used. In addition, the buck converter 202 may be a synchronous rectification type.

Second Embodiment

Figure 8:
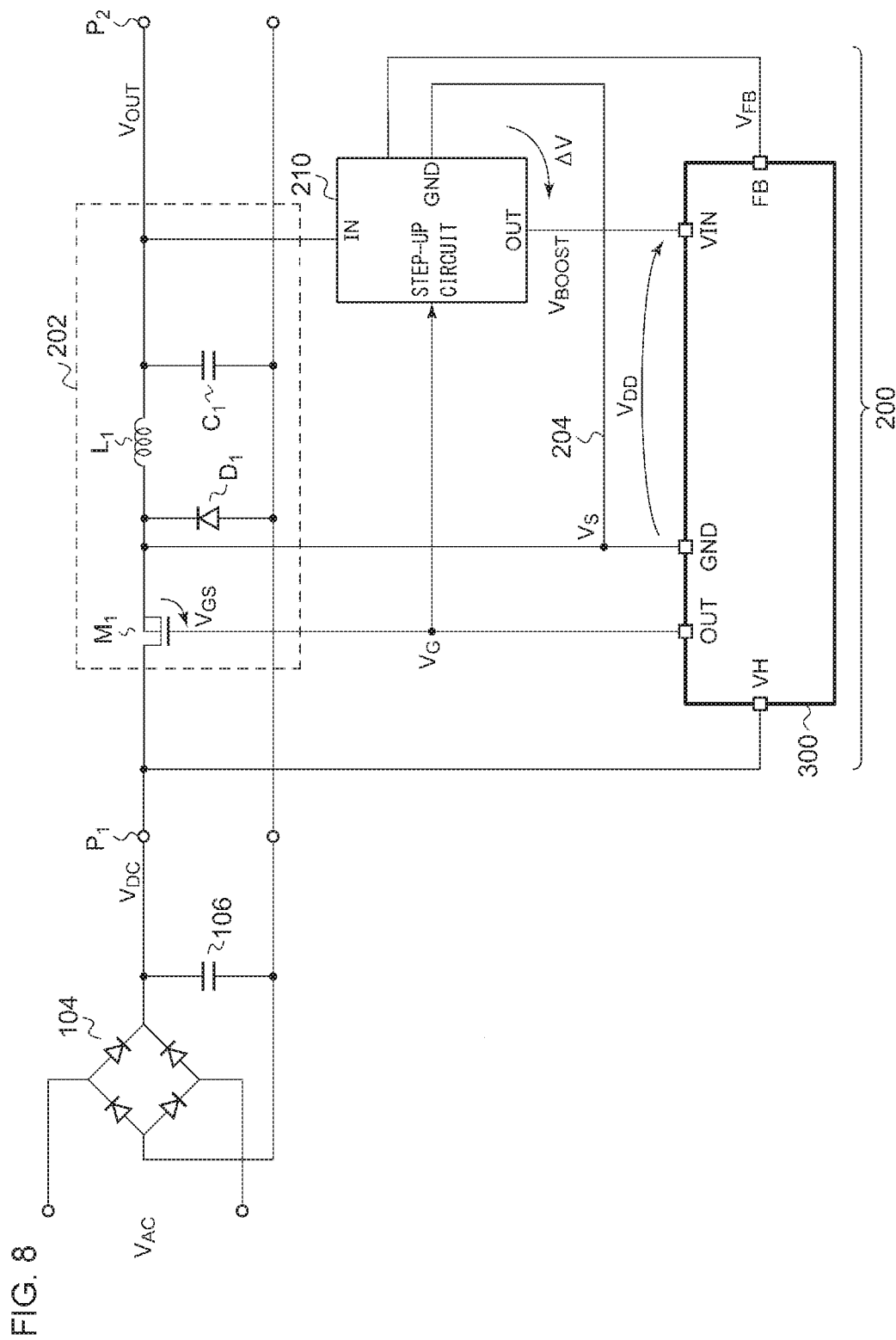
FIG. 8 is a circuit diagram of an AC/DC converter including a DC/DC converter according to a second embodiment.

FIG. 8 is a circuit diagram of an AC/DC converter 100 including a DC/DC converter 200 according to an embodiment. The AC/DC converter 100 includes a rectifier circuit 104, a smoothing capacitor 106, and a DC/DC converter 200.

The DC/DC converter 200 includes a non-isolated buck converter (step-down converter) 202, a step-up circuit 210, a controller 300, and peripheral components. A configuration of the buck converter 202 is similar to that of FIG. 1, and includes a switching transistor $M_1$, a rectifier diode $D_1$, an inductor $L_1$, and an output capacitor $C_1$.

The controller 300 includes a VH pin, an OUT pin, a GND pin, a VIN pin, and an FB pin. A commercially available controller may be used as the controller 300, and a configuration thereof is not particularly limited.

A wiring connected to a source of the switching transistor $M_1$ is referred to as a switching line 204. The GND pin (ground) of the controller 300 is connected to the switching line 204. The controller 300 generates a pulse signal whose duty ratio (or frequency) varies such that a voltage $V_{FB}$ fed back to the FB pin coincides with a predetermined target value, and supplies a gate drive pulse $V_G$ according to the pulse signal to the switching transistor $M_1$ via the OUT pin. A voltage having a correlation with an output voltage $V_{OUT}$ may be fed back to the FB pin, and this voltage is not particularly limited.

The step-up circuit 210 receives the output voltage $V_{OUT}$ and the gate drive pulse $V_G$ of the DC/DC converter 200 (buck converter 202). Further, the step-up circuit 210 generates a power supply voltage $V_{BOOST}$ obtained by stepping up the output voltage $V_{OUT}$ at an output OUT thereof and supplies the generated power supply voltage to the input pin ($V_{IN}$) of the controller 300. This power supply voltage $V_{BOOST}$ fluctuates while maintaining a higher state than a voltage $V_S$ of the switching line 204 by a constant potential difference $\Delta V$.

$$V_{BOOST} = V_S + \Delta V \quad (1)$$

The potential difference $\Delta V$ is given as $\Delta V = V_{OUT} + V_{ADD} \ldots$ (2A) when a step-up voltage width by the step-up circuit 210 is $V_{ADD}$. From another point of view, the potential difference $\Delta V$ generated by the step-up circuit 210 may be expressed as Formula (2B) assuming that a step-up rate by the step-up circuit 210 is $\alpha$ ($\alpha > 1$).

$$\Delta V = \alpha \times V_{OUT} \quad (2B)$$

The potential difference $\Delta V$ is determined so as to be larger than a gate threshold voltage $V_{GS(th)}$ of the switching transistor $M_1$.

$$\Delta V > V_{GS(th)} \quad (3)$$

Figure 9:
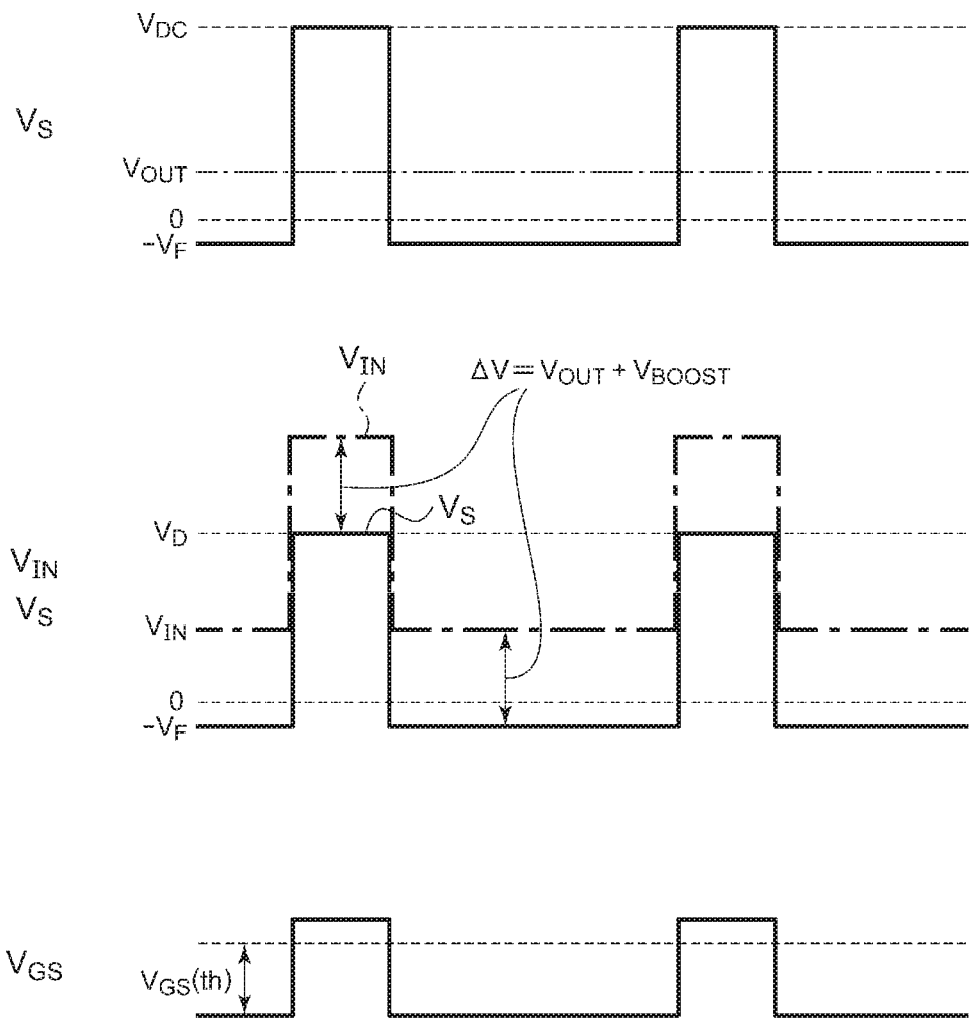
FIG. 9 is an operation waveform diagram of the DC/DC converter of FIG. 8.

The configuration of the DC/DC converter 200 has been described as above. Next, an operation thereof will be described. FIG. 9 is an operation waveform diagram of the DC/DC converter 200 of FIG. 8. When the switching transistor $M_1$ is switched at a duty ratio D in a steady state, the output voltage is stabilized such that $V_{OUT} \approx D \times V_{DC}$. At this time, the voltage $V_S$ of the switching line is switched between $V_{DC}$ and $-V_F$.

As described above, the power supply voltage $V_{BOOST}$ fluctuates while maintaining a state of being higher than the voltage $V_S$ of the switching line 204 by the potential difference $\Delta V$. This potential difference $\Delta V$ is larger than the gate threshold voltage $V_{GS(th)}$ of the switching transistor $M_1$.

$$V_{BOOST} = V_S + \Delta V \quad (4)$$

Here, $\Delta V = V_{OUT} + V_{ADD} > V_{GS(th)}$

A potential difference between the VIN pin and the GND pin of the controller 300, that is, a power supply voltage $V_{DD}$ of the controller 300 is $V_{DD} = V_{BOOST} - V_S = \Delta V$. Since $\Delta V > V_{GS(th)}$ is established although a maximum amplitude of a voltage (gate-source voltage) VGS that can be generated between the OUT pin and the GND pin, that is, a gate and the source of the switching transistor $M_1$ by the controller 300 is the power supply voltage $V_{DD} = \Delta V$, the controller 300 can reliably turn on the switching transistor $M_1$.

Since $\Delta V = V_{DD} \approx V_{OUT}$ in a DC/DC converter 200R of FIG. 1, it is necessary to satisfy that $V_{OUT} > V_{GS(th)}$. In contrast, $\Delta V = V_{OUT} + V_{ADD}$ is established according to the DC/DC converter 200 of FIG. 8, and thus, it is possible to satisfy that $V_{OUT} < V_{GS(th)}$. That is, a target voltage of the output voltage $V_{OUT}$ can be arbitrarily set without being restricted by the gate threshold voltage $V_{GS(th)}$, and can be set to be lower than that of the related art.

The invention extends to various apparatuses and circuits that are grasped as the block diagram and the circuit diagram of FIG. 8, or derived from the above description, and are not limited to specific configurations. Hereinafter, more specific configuration examples and examples will be described in order not to narrow the scope of the present invention but to aid understanding of the essence of the invention and the circuit operation and for the sake of clarification thereof.

Figure 10:
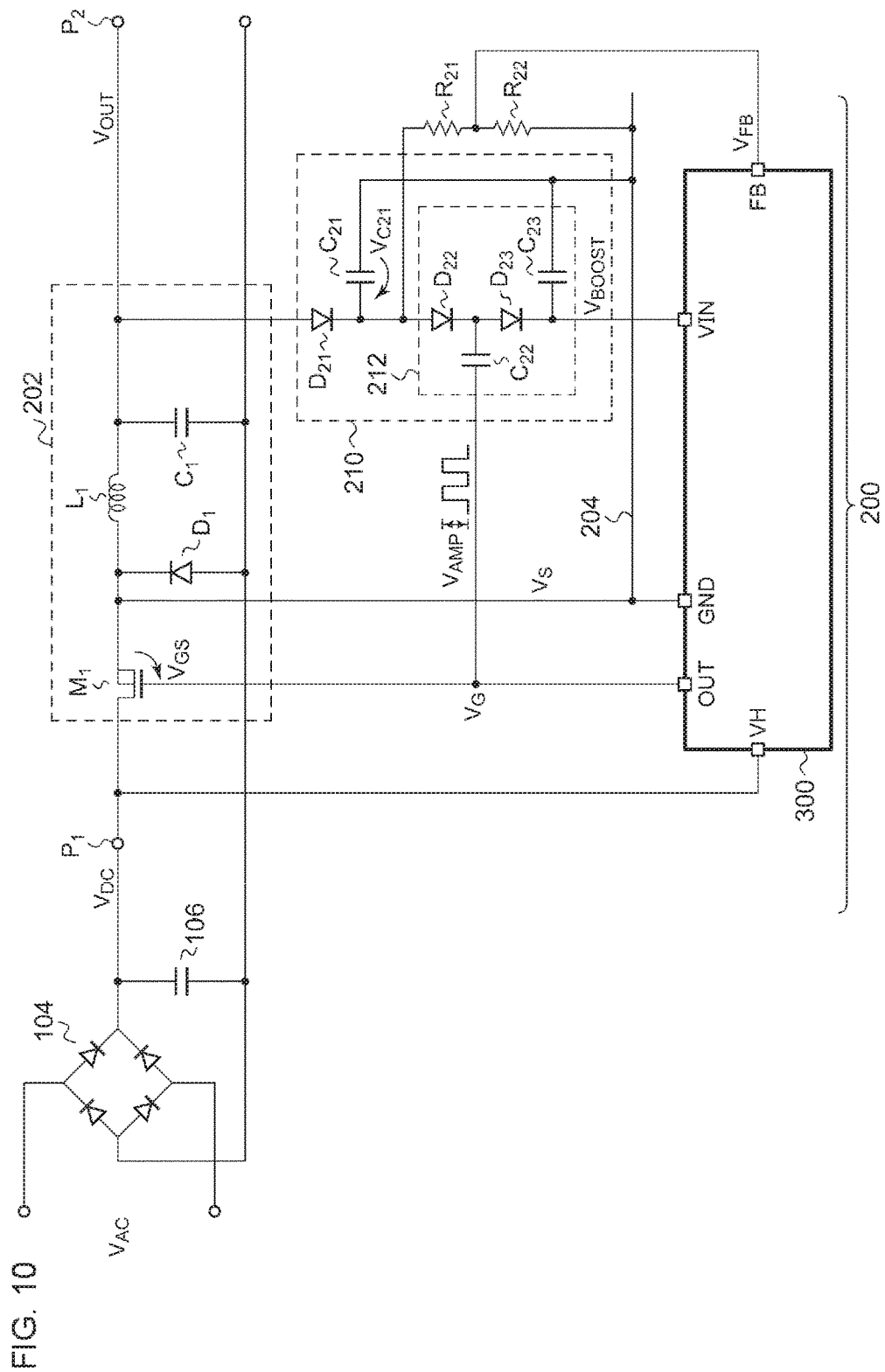
FIG. 10 is a circuit diagram illustrating a specific configuration example of the DC/DC converter of FIG. 8.

FIG. 10 is a circuit diagram illustrating a specific configuration example of the DC/DC converter 200. The step-up circuit 210 includes a first diode $D_{21}$, a first capacitor $C_{21}$, and a charge pump circuit 212.

One end of the first capacitor $C_{21}$ is connected to the switching line 204. The first diode $D_{21}$ has an anode that receives the output voltage $V_{OUT}$ of the DC/DC converter 200 (buck converter 202) and a cathode that is connected to the other end of the first capacitor $C_{21}$.

The charge pump circuit 212 is configured with the switching line 204 as a ground. The charge pump circuit 212 receives a voltage $V_{C21}$ across the first capacitor $C_{21}$ as an input voltage and performs a step-up operation according to the gate drive pulse $V_G$.

The charge pump circuit 212 is a voltage addition-type charge pump and includes a second diode $D_{22}$, a third diode $D_{23}$, a flying capacitor $C_{22}$, and an output capacitor $C_{23}$. A voltage $V_{C23}$ is generated across the output capacitor $C_{23}$ by a step-up operation of the charge pump circuit 212. Here, a forward voltage of the diode is not considered.

$$V_{C23} \approx V_{C21} + V_{AMP} \quad (5)$$

$V_{AMP}$ is the amplitude of the gate drive pulse $V_G$ when the potential $V_S$ of the switching line 204 is set as a reference. Considering the forward voltage, $$V_{C23} = V_{C21} + V_{AMP} - 2V_F \quad (6).$$

Voltage $V_{C21}$ of FIG. 10 is a voltage corresponding to a voltage $V_{IN}$ of FIG. 1, and thus, is equal to $V_{OUT}$. In addition, the voltage $V_{C23}$ of the output capacitor $C_{23}$ is $\Delta V$ in FIG. 9. Therefore, Formula (5) can be rewritten to Formula (7).

$$\Delta V = V_{OUT} + V_{AMP} \quad (7)$$

In this manner, the appropriate power supply voltage $V_{BOOST}$ can be supplied to the VIN pin of the DC/DC converter 200 according to the step-up circuit 210 of FIG. 10.

For example, the voltage $V_{FB}$ obtained by dividing the voltage $V_{C21}$ across the first capacitor $C_{21}$ by resistors $R_{21}$ and $R_{22}$ is fed back to the FB pin of the controller 300. In this case, the gate drive pulse $V_G$ is generated such that $V_{FB} = V_{C21} \times R_{22}/(R_{21} + R_{22})$ coincides with an internal reference voltage $V_{REF}$. Therefore, feedback is applied such that $V_{C21} = (R_{21} + R_{22})/R_{22} \times V_{REF}$. As described above, since $V_{C21} = V_{OUT}$, a target voltage $V_{OUT(REF)}$ of the output voltage $V_{OUT}$ becomes $V_{OUT(REF)} = (R_{21} + R_{22})/R_{22} \times V_{REF}$.

Figure 11:
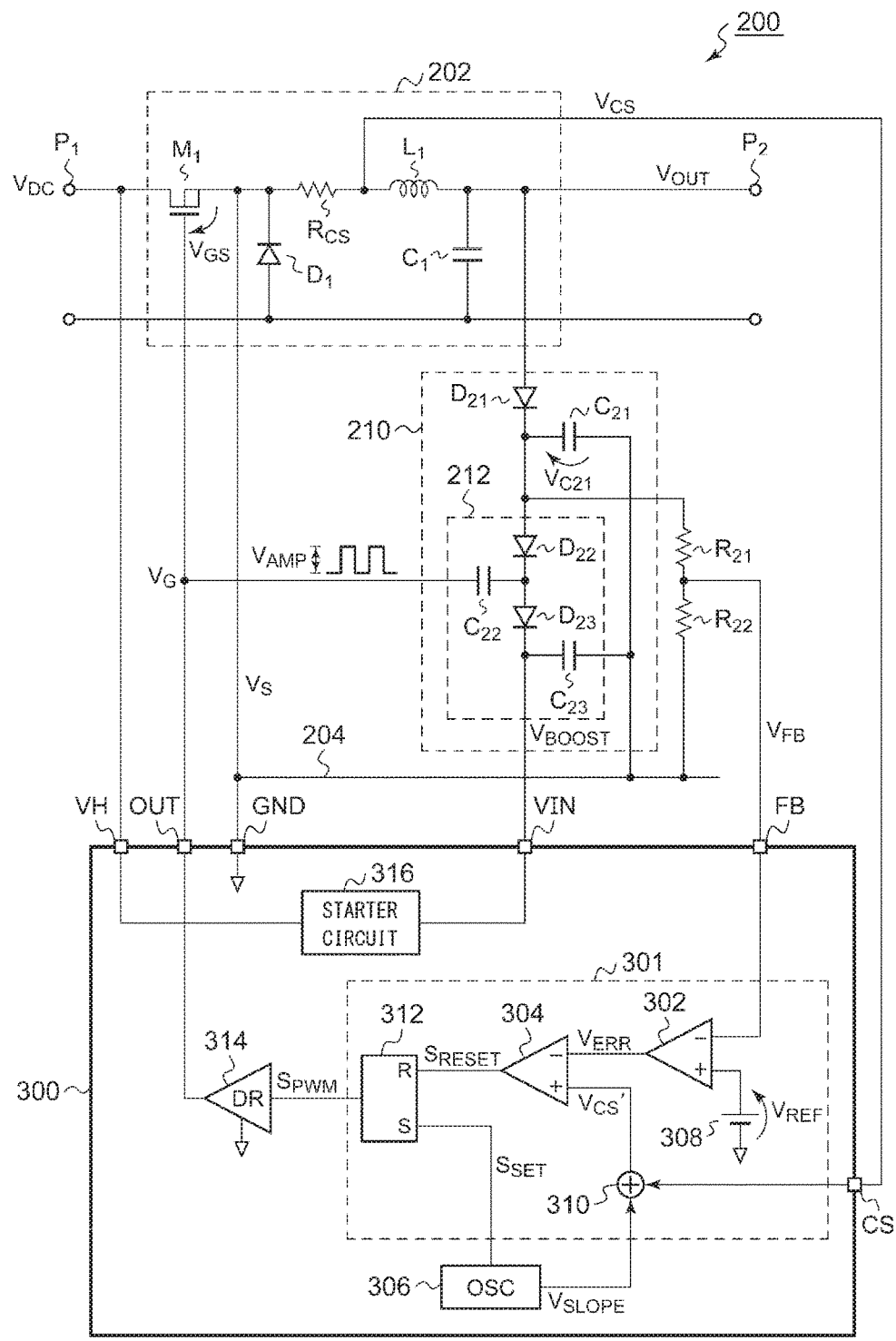
FIG. 11 is a circuit diagram illustrating a configuration example of a controller.

FIG. 11 is a circuit diagram illustrating a configuration example of the controller 300. The controller 300 is a controller of a peak current mode. The buck converter 202 includes a current sense resistor $R_{CS}$ provided between the switching transistor $M_1$ and the inductor $L_1$. A current detection signal $V_{CS}$ corresponding to a voltage drop across the current sense resistor $R_{CS}$ is input to a current sense (CS) pin of the controller 300.

An internal circuit of the controller 300 operates with the voltage $V_S$ of the switching line 204 supplied to the GND pin as a ground. The controller 300 includes a pulse modulator 301, an oscillator 306, a driver 314, and a starter circuit 316. The oscillator 306 oscillates at a predetermined frequency to generate a set pulse $S_{SET}$ and a slope signal $V_{SLOPE}$. The pulse modulator 301 generates a pulse signal $S_{PWM}$ in synchronization with the signals $S_{SET}$ and $V_{SLOPE}$ generated by the oscillator 306.

A reference voltage source 308 generates the reference voltage $V_{REF}$. An error amplifier 302 amplifies an error between the voltage $V_{FB}$ fed back to the FB pin and the reference voltage $V_{REF}$ to generate an error signal $V_{ERR}$. A slope compensator 310 superimposes the slope signal $V_{SLOPE}$ on the current detection signal $V_{CS}$ input to the CS pin.

A comparator 304 compares the error signal $V_{ERR}$ with a current detection signal $V_{CS}'$ on which the slope signal $V_{SLOPE}$ is superimposed, and asserts a reset pulse $S_{RESET}$ (for example, sets the reset pulse to a high level) when $V_{CS}' > V_{ERR}$. A flip-flop 312 transitions to an off-level (for example, a low level) in response to the assertion of the reset pulse $S_{RESET}$, and generates a pulse signal $S_{PWM}$ to transition to an on-level (for example, a high level) in response to the set pulse $S_{SET}$. A driver 314 generates the gate drive pulse $V_G$ of the switching transistor $M_1$ based on the pulse signal $S_{PWM}$. A starter circuit 316 receives a DC voltage $V_{DC}$ input to the VH pin and charges the capacitor $C_{23}$ via the VIN pin at the time of activating the controller 300.

The invention has been described as above based on the embodiments. Those examples are illustrative, and it is understood by those skilled in the art that various types of modification examples can be made in combinations of the respective components and the respective processes, and further, such modification examples are included in a range of the invention. Hereinafter, such modifications will be described.

Fourth Modification

Figure 12A:
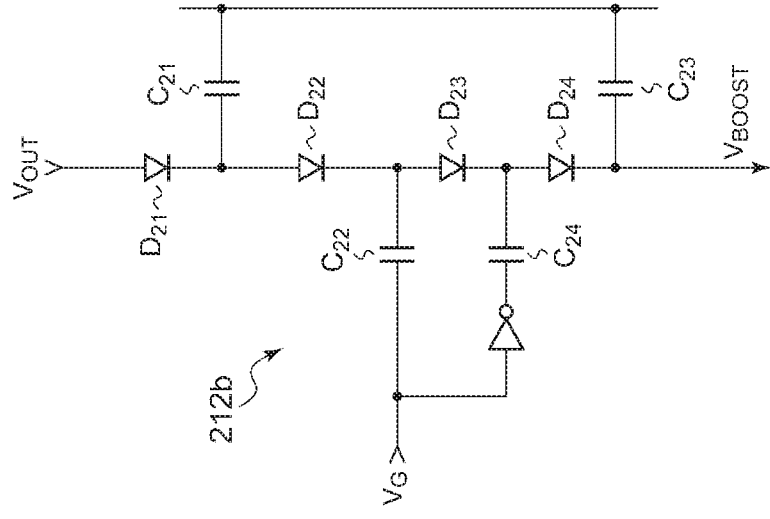
FIGS. 12A and 12B are circuit diagrams illustrating modifications of a step-up circuit.
Figure 12B:
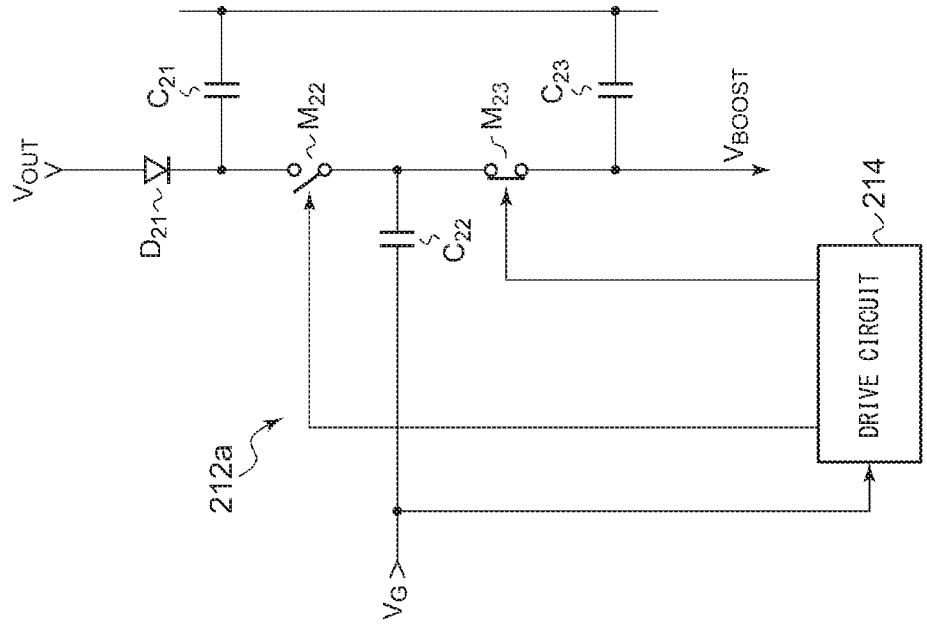

The configuration of the step-up circuit 210 is not limited to FIG. 10. FIGS. 12A and 12B are circuit diagrams illustrating modifications of the step-up circuit 210. A charge pump circuit 212a in FIG. 12A includes switches $M_{22}$ and $M_{23}$ in place of the diodes $D_{22}$ and $D_{23}$, and a drive circuit 214 of the switches $M_{22}$ and $M_{23}$. The drive circuit 214 drives the switches $M_{22}$ and $M_{23}$ in synchronization with the gate drive pulse $V_G$. The drive circuit 214 may be built in the controller 300. In addition, the switches $M_{22}$ and $M_{23}$ configured using MOSFETs may be built in the controller 300.

FIG. 12B illustrates a two-stage charge pump circuit 212b which includes two flying capacitors $C_{22}$ and $C_{24}$. A step-up voltage may be expressed by the following formula when a forward voltage of a rectifier element is not considered.

$$V_{BOOST} = V_{OUT} + V_{AMP} \times 2$$

The number of stages of the charge pump circuit is not particularly limited and may be three or more.

Fifth Modification

The configuration of the controller 300 is not limited to that in FIG. 11, and a controller of an average current mode or a controller of a voltage mode may be used. In addition, the buck converter 202 may be a synchronous rectification type. Application Next, the application of the DC/DC converter 200 described in the first or second embodiment will be described.

Figure 13:
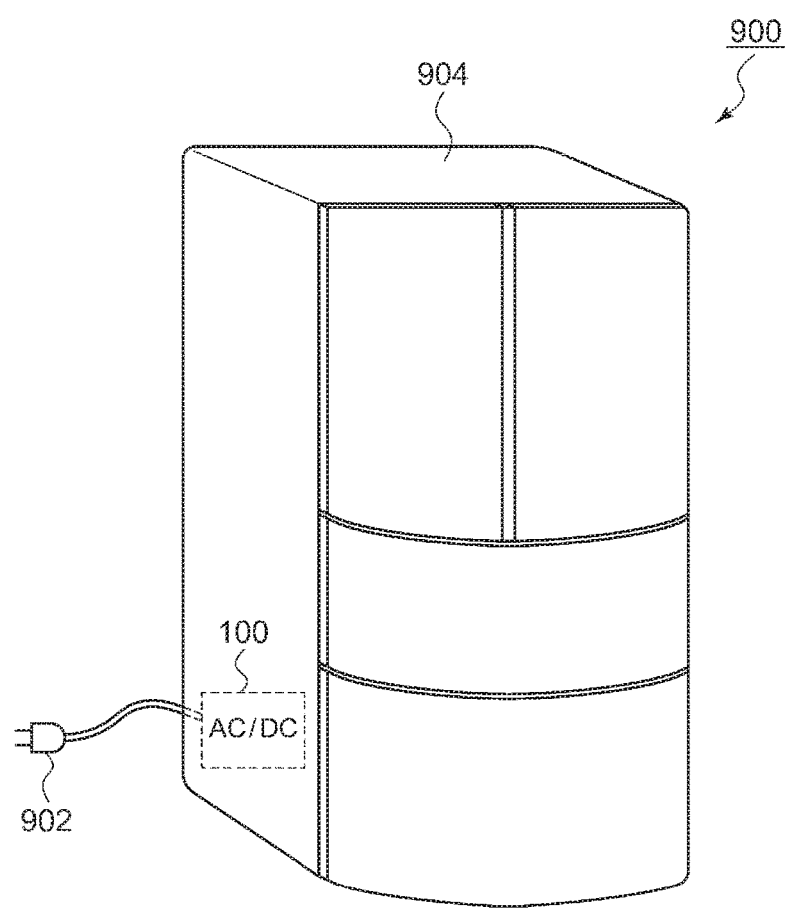
FIG. 13 is a diagram illustrating an electronic device including an AC/DC converter.

FIG. 13 is a diagram illustrating an electronic device 900 including the AC/DC converter 100. The electronic device 900 in FIG. 7 is a refrigerator, but a type of the electronic device 900 is not particularly limited, and can be widely employed in so-called white goods with a built-in power supply apparatus such as a washing machine, a vacuum cleaner, and a rice cooker. Alternatively, the AC/DC converter 100 may also be employed in a lighting apparatus.

A plug 902 receives a commercial AC voltage $V_{AC}$ from an electrical outlet (not illustrated). The AC/DC converter 100 is mounted inside a housing 904. The DC output voltage $V_{OUT}$ generated by the AC/DC converter 100 is supplied to a load (not illustrated), such as an inverter, a converter, a microcomputer, a lighting apparatus, an analog circuit, and a digital circuit, mounted inside the same housing 904.

While the preferred embodiments of the present invention have been described using specific terms, such description is for illustrative purposes only, and it is to be understood that changes and variations may be made without departing from the spirit or scope of the appended claims.

What is claimed is:

1. A non-isolated DC/DC converter comprising:
   a buck converter including a switching transistor;
   a controller whose ground is connected to a switching line connected to a source of the switching transistor, and which drives the switching transistor and generates a step-up pulse; and
   a step-up circuit which receives an output voltage of the DC/DC converter and generates a power supply voltage of the controller by using the step-up pulse,
   wherein the step-up circuit includes:
   a first capacitor whose one end is connected to a switching line;
   a first diode which has an anode receiving the output voltage of the DC/DC converter and a cathode connected to another end of the first capacitor; and
   a charge pump circuit which is configured with the switching line as a ground, receives a voltage across both ends of the first capacitor as an input voltage, and performs a step-up operation according to the step-up pulse.

2. The DC/DC converter according to claim 1, wherein the switching transistor is built in a same package as the controller.

3. The DC/DC converter according to claim 1, wherein the controller includes:
   an oscillator;
   a pulse width modulator which generates a pulse signal in synchronization with a signal generated by the oscillator;
   a driver which drives the switching transistor according to the pulse signal; and
   a step-up pulse generator which generates the step-up pulse based on a signal generated by the oscillator.

4. The DC/DC converter according to claim 1, wherein the step-up pulse is a gate drive pulse supplied to a gate of the switching transistor.

5. The DC/DC converter according to claim 1, wherein the controller receives a voltage of the other end of the first capacitor as a feedback voltage and drives the switching transistor such that the feedback voltage coincides with a reference voltage.

6. The DC/DC converter according to claim 1, wherein the charge pump circuit generates a voltage obtained by adding a voltage across both ends of the first capacitor and an amplitude of the step-up pulse.

7. The DC/DC converter according to claim 1, wherein the charge pump circuit includes a plurality of diodes.

8. The DC/DC converter according to claim 1, further comprising
a drive circuit that drives a plurality of switches in synchronization with the step-up pulse,
wherein the charge pump circuit includes the plurality of switches.

9. The DC/DC converter according to claim 8, wherein the plurality of switches and the drive circuit are integrated on a same semiconductor substrate as the controller.

10. A controller of a non-isolated DC/DC converter, the DC/DC converter including not only the controller but also a buck converter and a step-up circuit which generates a power supply voltage of the controller according to an output voltage of the DC/DC converter and a step-up pulse, the controller comprising:
a switching transistor;
a ground pin connected to a source of the switching transistor;
a high-voltage pin connected to a drain of the switching transistor;
a feedback pin which needs to receive a feedback voltage according to the output voltage of the DC/DC converter;
an oscillator;
a pulse modulator which generates a pulse signal whose duty ratio varies such that the feedback voltage and a reference voltage approximate to each other in synchronization with the oscillator;
a driver which drives the switching transistor based on the pulse signal; and
a step-up pulse generator which generates the step-up pulse in synchronization with the oscillator, wherein the step-up circuit includes:
a first capacitor having one end connected to a switching line;
a first diode which has an anode receiving the output voltage of the DC/DC converter and a cathode connected to another end of the first capacitor; and
a charge pump circuit which is configured with the switching line as a ground, receives a voltage across both ends of the first capacitor as an input voltage, and performs a step-up operation according to the step-up pulse.

11. The controller according to claim 10 that is integrally integrated on one semiconductor substrate.

12. A DC/DC converter comprising the controller according to claim 10.

13. An electronic device comprising:
a load;
a diode rectifier circuit which performs full-wave rectification of an AC voltage;
a smoothing capacitor which smooths an output voltage of the diode rectifier circuit to generate a DC input voltage; and
a non-isolated DC/DC converter which steps down the DC input voltage and supplies the stepped-down DC input voltage to the load, wherein the non-isolated DC/DC converter comprises:
a buck converter including a switching transistor;
a controller whose ground is connected to a switching line connected to a source of the switching transistor, and which drives the switching transistor and generates a step-up pulse; and
a step-up circuit which receives an output voltage of the DC/DC converter and generates a power supply voltage of the controller by using the step-up pulse.

* * * * *